Patented Mar. 8, 1938

2,110,370

UNITED STATES PATENT OFFICE 2,110,370

CARBONACEOUS FUEL AND METHOD OF PREPARING THE SAME

James Henry Lum, Dayton, Ohio, assignor to Stonega Coke and Coal Company, Incorporated, Philadelphia, Pa., a corporation of Delaware No Drawing. Application July 9, 1935, Serial No. 30,520

7 Claims. (Cl. 44—1)

This invention relates to fuels and more particularly to the treatment of carbonaceous fuel to improve its combustion characteristics.

It is the principal object of the invention to provide a simple, inexpensive, and effective method of treating solid fuel to improve its combustion characteristics and to reduce its clinkering tendency.

It is the further object to provide for the addition to the fuel of additive materials in such form that the fuel can be easily handled, and the additive materials remain distributed throughout the fuel in uniform and effective relationship thereto.

It is a further object to provide as a new product for incorporation with solid fuel to control its combustion characteristics, a solid material comprising the additive material for effecting such controlled combustion and capable of being handled in the same manner as and along with the fuel itself.

It is a further object to provide a product of this character which can be added to solid fuel without substantially altering the appearance thereof.

Other objects and advantages will be apparent from the following description and appended claims.

In the burning of solid carbonaceous fuel, as is well known, the ash of the fuel has a tendency to form objectionable clinker, this characteristic becoming more pronounced with increase in combustion temperatures. The tendency is also more pronounced in some fuels than in others, and those fuels which are capable of burning at high temperature without objectionable clinker formation are particularly desirable for many purposes.

The combustion characteristics, and more particularly clinkering tendency of such a fuel, may be improved through the addition thereto of certain mineral materials, principally of a refractory nature. For instance, when a material such as clay, or bauxite, is added to a solid carbonaceous fuel, in controlled amounts, it is found that the softening temperature of the fuel ash and consequently the clinkering tendency of the fuel are much improved. In practical operations through the addition of a relatively small quantity of such mineral material, a material improvement in these characteristics can be successfully attained. Either clay or bauxite may be used alone, or very satisfactory results are also obtained through the utilization of a mixture of clay and bauxite in predetermined relative proportions. Other materials may also be used to provide combustion modifying characteristics, such for instance as calcium oxide, magnesium carbonate, and other mineral materials.

In accordance with the present invention these or other desired materials are incorporated with the solid fuel in a very simple and effective manner. A fused or coke-like mass is produced, including such additive material, which may be handled as a solid along with the solid fuel, and which may also have an appearance so similar to that of the fuel as to not produce any noticeable change in the outward appearance of the fuel. As opposed to prior attempts to apply additive material through the action of an adhesive for attaching such material to the surface of the fuel where it was subject to being washed, blown, or brushed off during handling or exposure, the material of the present invention may be added in solid or lump form and is not affected by the elements.

This invention also provides for the incorporation of the additive material at any desired time and in the desired amount to provide predetermined quantities of the additive material in proportion to the quantity of solid fuel. And practical operating results have shown that when fuel including such additive modifying material is burned, the modifying material is sufficiently distributed throughout the fuel and throughout the zone of combustion to properly affect and control the entire combustion reaction, thereby making this modifying action uniformly effective throughout the entire body of the fuel being burned.

This material preferably comprises a mixture of a mineral refractory or other combustion modifying material and a binder having the desired binding and other characteristics such as appearance, strength, and the like. The material preferred to be used for such binder is coal, which may be mixed with the refractory material and the mass then subjected to heating conditions, such as to convert the binder into a plastic, which surrounds the mineral material and on continued heating and subsequent cooling loses its specific properties and solidifies to a hard coke-like mass, thus forming a homogeneous fused product. Preferably the heating is carried out under conditions where oxygen is excluded, such for instance as under conditions similar to those provided during coking, and a fused, coke-like product, rich in additive modifying material, is thereby produced. Upon cooling, the mass may be broken up to the desired size and may be handled in the same manner as the fuel with which it is used, or the carbonizing conditions such as proportion of binder, heating conditions and the like may be so controlled as to produce a product as discharged of substantially granular size. Very satisfactory results using coal as the binder have been obtained, coal being available inexpensively, and producing a fused product having sufficient strength to withstand handling, and producing a product that can be used satisfactorily, with both coke and coal, for example, and without having an appearance objectionably in contrast therewith.

In the producing of the material of this invention, a mixture of coal and refractory material comprising, for example, clay and bauxite is made up. While a wide range of relative proportions may be used, it has been found desirable for commercial operations to control the relative proportions of modifying material and binder within approximately the range of 33% to 75% binder, and 67% to 25% additive modifying material. These limits are given as representative only, as greater or lesser quantities of either constituent may be used as desired. For some purposes it is desired to use a product in which the modifying material is even more diluted, such as comprising of the order of 10% of the total, the remainder being binder. Usually it is not desired to decrease the proportion of binder substantially below 33% as within this limit the resulting mass has been found to have substantially coke-like appearance and properties. The ingredients may be coarsely ground and thereafter mixed, although it has been found that a more homogeneous product is obtained the finer the ingredients are ground. After being thoroughly intermixed, the mass is heated to a suitable temperature at which the binder becomes plastic and flows, which for bituminous coal is approximately 350° C. Heating to temperatures of the order of 1100° C. has been found to produce very satisfactory results. During such heating operation air should be excluded through the use of a closed retort or similar well known apparatus.

Instead of preparing a preliminary mixture of the materials prior to heating, the materials may be heated separately if desired and thereafter mixed in the heated condition, the binder being or becoming plastic and surrounding the modifying material and mixing uniformly therewith to produce the homogeneous product as described.

After the binder becomes plastic and intermixes in the desired manner with the mineral material, the mass may be cooled and broken up to a desired size. The size to which the material is ground is preferably controlled in accordance with the size characteristics of the solid fuel. For example the material may be crushed to pass a quarter inch screen and when mixed with solid fuel of substantially the same size order, is found to maintain a substantially uniform distribution and to uniformly affect the use characteristics of the fuel. When the relative dilution of the modifying material in the product is increased, such for example as a product comprising approximately 90% binder and 10% modifying material, it is found that the product can be added in materially larger size without producing objectionable concentration. Thus with a composition of this character the product may be used in lump size and is found to produce the desired uniformity in results.

The product is then added to solid fuel such as coal in such proportion as to provide the desired ratio of the mineral material to the coal. For example, it may be added in such amount that the additive mineral material equals the quantity of ash in the fuel being treated, or in greater or less amount as desired. Also it will be clear that any suitable additive fuel modifying material in addition to those mentioned may be added to the fuel in this manner either of a refractory or non-refractory nature, and the invention thus provides a very satisfactory method of incorporating a desired additive material with solid fuel.

The material of this invention may be added to solid fuels such as coal at any point in its treatment, either at the mine, or at some subsequent point, as desired. Furthermore this material may be added to coke in the desired proportions to produce a similar improvement in the combustion characteristics of this fuel. It has also been found that this material may be added to coal prior to coking and that the resulting coke product, incorporating this additive material, has very desirable characteristics of raised softening temperature of its ash, and decreased clinkering tendency. Thus for example the product of this invention may be added to the coke oven at the time the coal is supplied thereto, and the coking operation carried out in the presence of such product.

The invention therefore provides new and very satisfactory methods of improving the characteristics of solid fuel through the addition thereto of certain additive materials. The material may be produced quite inexpensively and is incorporated with the solid fuel in such form as not to detract from the normal appearance thereof, and also such that loss or alteration of additive material under the normal conditions of handling, shipping, storing and the like, is rendered negligible.

While the process and products herein described constitute preferred embodiments of the invention, it is to be understood that the invention is not limited to these precise processes and products, and that changes may be made therein without departing from the scope of the invention which is defined in the appended claims.

What is claimed is:

1. Bulk fuel in solid lump form of the character of coal, coke, or the like, having an inferior ash-fusion characteristic as to form clinkers, and having fused combustible agglomerates blended and distributed uniformly throughout the bulk of solid fuel, the said agglomerates being capable of and being added in quantity sufficient to improve the ash-fusion characteristic and to substantially eliminate clinker formation during combustion of the blended fuel, the said agglomerates comprising a mixture rich in refractory material and bonded into lumps with a normally solid granular fuel, the said agglomerates further having an appearance similar to that of the bulk fuel with which it is blended so that the natural appearance of the solid fuel in bulk form is not materially changed by the addition thereto of the agglomerates.

2. Bulk fuel in solid lump form of the character of coal, coke, or the like, having an inferior ash-fusion characteristic as to form clinkers, and having fused combustible agglomerates blended and distributed uniformly throughout the bulk of solid fuel, the said agglomerates being capable of and being added in quantity sufficient to improve the ash-fusion characteristic and to substantially eliminate clinker formation during combustion of the blended fuel, the said agglomerates comprising a mixture of coal and refractory mineral material containing from 30% to 75% coal and from 25% to 67% of added refractory mineral material, the said agglomerates further having an appearance similar to that of the bulk fuel with which it is blended so that the natural appearance of the solid fuel in bulk form is not materially changed by the addition thereto of the agglomerates.

3. The method of raising the ash-fusion temperature and lowering the clinkering tendency of solid fuel such as coal, coke, or the like, the steps comprising, forming a fused combustible agglomerate having coke-like appearance and comprising a mixture rich in refractory mineral material bonded with a normally solid granular fuel, breaking the agglomerates into granular size, and distributing them substantially uniformly throughout a bulk of the solid fuel, the agglomerates being added in quantity sufficient to raise the ash-fusion temperature and to substantially eliminate clinker formation during combustion of the solid fuel and the added agglomerates.

4. The method of raising the ash-fusion temperature and lowering the clinkering tendency of solid fuel such as coal, coke, or the like, the steps comprising, forming a fused combustible agglomerate of a mixture of coal and refractory mineral material containing from 30% to 75% coal and from 25% to 67% of added refractory mineral material, breaking the agglomerates into granular size, and distributing them substantially uniformly throughout a bulk of the solid fuel, the agglomerates being added in quantity sufficient to raise the ash-fusion temperature and to substantially eliminate clinker formation during combustion of the solid fuel and the added agglomerates.

5. A fused combustible agglomerate for mixing with solid fuel of the character of coal, coke, or the like, and for distribution throughout a bulk of the said solid fuel in order to raise the ash-fusion temperature and to substantially eliminate clinker formation during combustion of said solid fuel and the added agglomerate, the said combustible agglomerate comprising a fused, granular, coke-like mixture of coal and refractory mineral material containing from 30% to 75% coal and from 25% to 67% of added refractory mineral material.

6. The method of improving the combustion characteristics of solid fuel which comprises adding thereto in lump form a predetermined amount of a fused mass containing from 33% to 75% coal and from 25% to 67% of added refractory mineral material.

7. An altered solid fuel comprising coal, coke or the like having distributed therethrough in predetermined quantity a fused mass containing approximately 33% to 75% of a binder material and 25% to 67% of refractory mineral material of the character adapted to increase the softening temperature of the fuel ash.

JAMES HENRY LUM.